March 5, 1957 O. E. HILL 2,783,595
GRINDING MACHINE HEADSTOCK
Filed Oct. 8, 1954 2 Sheets-Sheet 1

INVENTOR.
OIVA E. HILL
BY
Harold W. Eaton
ATTORNEY

March 5, 1957  O. E. HILL  2,783,595
GRINDING MACHINE HEADSTOCK
Filed Oct. 8, 1954  2 Sheets-Sheet 2

INVENTOR.
OIVA E. HILL
BY
Harold W. Eaton
ATTORNEY

United States Patent Office 2,783,595
Patented Mar. 5, 1957

2,783,595

GRINDING MACHINE HEADSTOCK

Oiva E. Hill, Worcester, Mass., assignor to Norton Company, Worcester, Mass., a corporation of Massachusetts Application October 8, 1954, Serial No. 461,521

3 Claims. (Cl. 51—237)

This invention relates to grinding machines, and more particularly to a multiple speed work driving mechanism.

One object of the invention is to provide a simple and thoroughly practical grinding machine variable speed headstock. Another object is to provide a motor driven headstock having a variable speed driving mechanism for varying the rotative speed of the work. Another object of the invention is to provide a motor driven two-speed clutch mechanism to drive an intermediate shaft at either a high or a low speed and to provide a variable speed cone pulley drive between said shaft and the work driving face plate which can be varied by a 3 to 1 ratio so that a 9 to 1 work speed ratio may be obtained. Another object is to provide a variable speed headstock drive whereby a 9 to 1 work speed ratio may be obtained with a standard single speed electric motor. Other objects will be in part obvious or in part pointed out hereinafter.

In the accompanying drawings in which is shown one of various possible embodiments of the mechanical features of the invention;

Figure 1:
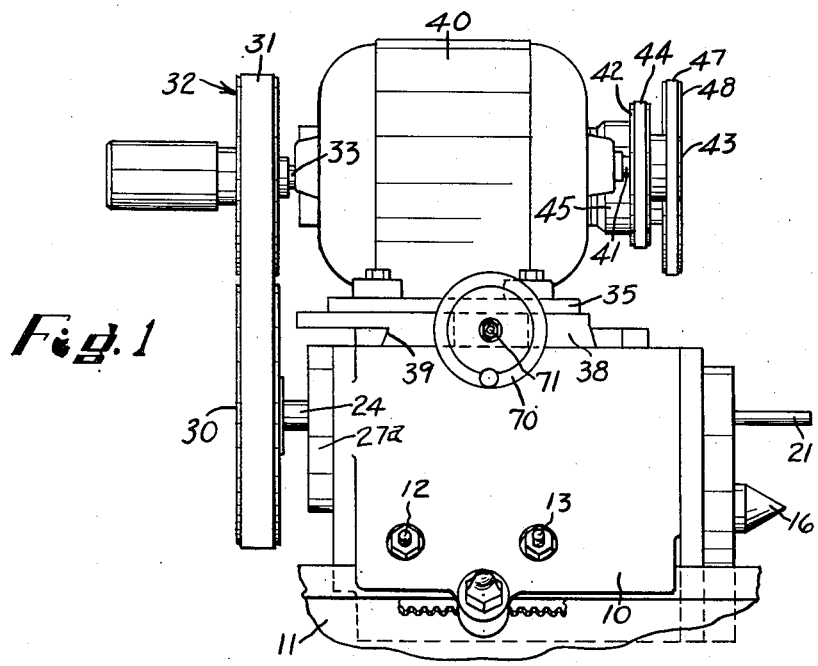
Fig. 1 is a front elevation of a grinding machine headstock.

A grinding machine headstock 10 is mounted on a longitudinally movable work supporting table 11. The headstock 10 is adjustably clamped onto the table 11 by a pair of spaced clamping bolts 12 and 13.

The headstock is provided with a work supporting spindle 15 having a work supporting center 16 for supporting the left hand end of a work piece to be ground. A multiple V-groove pulley 17 is supported on a pair of spaced anti-friction bearings 18 and 19 which are in turn supported on the spindle 15. A face plate 20 having a work driving pin 21 is fixedly mounted on the right hand end face of the pulley 17. The pulley 17 is connected by multiple V-belts 22 with a multiple V-groove pulley 23 supported on the right hand end of a rotatable shaft 24. The pivot 24 is journalled in spaced anti-friction bearings 25 and 26 which are in turn supported within an eccentric sleeve 27. The eccentric sleeve is provided with an end plate 27a to facilitate a rotary adjustment of the sleeve 27 to tension the V-belts 22 as desired. A clamping screw 28 passes through an elongated arcuate slot 29 formed in the end plate 27a and is screw threaded into the headstock 10. By loosening the clamping screw 28, the end plate 27a together with the sleeve 27 may be rotatably adjusted for tensioning the belts 22.

It is desirable to provide a variable speed driving mechanism for a grinding machine headstock so that the rotary speed of the work piece being ground may be varied as desired to produce the desired work speed for a grinding operation. A V-groove pulley 30 is mounted on the left hand end of the spindle 24. The pulley 30 is connected by a relatively wide V-belt 31 with a variable speed cone pulley 32 which is supported on the left hand end of a rotatable shaft 33. The variable speed cone pulley 32 may be of any of the standard variety of commercial cone pulleys such as a Roto-Cone variable pitch motor pulley such as manufactured by Gerbing Mfg. Corp. of Northbrook, Illinois, under U. S. Patents Nos. 2,475,954 and 2,475,955 to W. E. Gerbing dated July 12, 1949, to which reference may be had for details of disclosure not contained herein. This cone pulley comprises a pair of spaced conical disc members 32a and 32b which are normally urged toward each other by a compression spring 32c. As the distance is varied between the shaft 24 and the shaft 32, the cone shaped discs 32a and 32b are moved relatively toward or from each other to vary the effective diameter thereof thereby to vary the rotative speed of the pulley 30 and the shaft 24 in a manner to be hereinafter described. The right hand end of the shaft 33 is supported by an anti-friction bearing 34 which is supported by a frame 35. The right hand end of the shaft 33 supports a rotatable sleeve 36 which is journalled in an anti-friction bearing 37 carried by the frame 35. The frame 35 is mounted on a transversely movable slide 38 which is provided with a dove-tailed slideway mating with a dove-tailed slideway 39 formed on the upper surface of the headstock 10.

Figure 3:
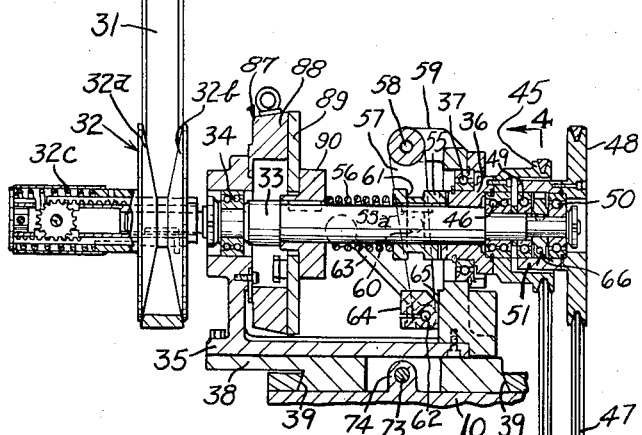
Fig. 3 is an exploded view of the operating parts of the headstock showing the drive mechanism between the motor and the work driving face plate.

The rotation of the shaft 33 may be stopped, if desired, by a magnetic brake 87 which is indicated in Fig. 3. The brake may be of any of the well known magnetic brakes such as, for example, that manufactured by the Warner Electric Brake Mfg. Co. of Beloit, Wisconsin. The brake 87 comprises a stationary part 88 which is fixedly mounted on the frame 85, and a rotatable member 89 which is fixedly mounted on a flanged sleeve 90 which is in turn keyed to the shaft 33.

My improved variable speed work driving mechanism makes provision for obtaining a 9 to 1 work speed ratio with a standard single speed motor. A 3 to 1 speed variation may be obtained by manipulation of the Roto-Cone pulley in a manner to be hereinafter described.

A high and low speed drive mechanism is provided for the shaft 33. The slide 38 serves as a support for a motor 40 which is provided with a motor shaft 41 having a pair of spaced pulleys comprising a high speed pulley 42 and a low speed pulley 43. The high speed pulley 42 is connected by a V-belt 44 with a V-groove pulley 45 which is fastened to the right hand end face of the rotatable sleeve 36. An anti-friction bearing 46 is interposed between the pulley 45 and the shaft 33 to take up the radial thrust of the drive upon the shaft 33.

The slow speed pulley 43 is connected by a V-belt 47 with a V-groove pulley 48 which is fixedly supported on a rotatable sleeve 51. The sleeve 51 is rotatably supported by a pair of spaced anti-friction bearings 49 and 50 supported on the right hand end of the shaft 33. A clutch member 55 is slidably keyed on the shaft 33 by a key 55a and is arranged to be moved into or out of engagement with clutch teeth formed on the left hand end face of the sleeve 36. The clutch 55 is normally held in engagement with the clutch teeth on the sleeve 36 by means of a compression spring 56. A manually operable clutch actuating mechanism is provided comprising a rock arm 57 pivotally supported by a stud 58 which is supported on a bracket 59 formed integral with the frame 35. The rock arm 57 is provided with a stud 60 which rides in a groove 61 formed in the periphery of the clutch member 55. The lower end of the rock arm 57 is provided with a rock shaft which supports a control lever 63 and also a cam 64. When it is desired to disengage the clutch member 55, the control lever 63 is rocked in a clockwise direction so that the cam 64 acting upon a left hand end face 65 of the frame 35 will rock the rock arm 57 in a clockwise direction to disengage the clutch. The clutch 55 serves when engaged to locate the high speed pulley 45 to the shaft 33 to impart a relatively high speed rotation thereto.

A ball clutch 66 is provided between the shaft 33 and the sleeve 51. The ball clutch 66 is located between the anti-friction bearings 49 and 50 for providing a driving connection between the pulley 48 and the shaft 33 when the clutch 55 disengages. The ball clutch 66 comprises an inner member 67 which is keyed to the shaft 33 (Fig. 14). An internal cylindrical surface 68 on the sleeve 51 forms the outer member of the ball clutch 66. The inner member 67 is arranged to be drivingly connected therewith by a plurality of spring pressed balls 69 with the inner surface 68 of the sleeve 51.

Figure 4:
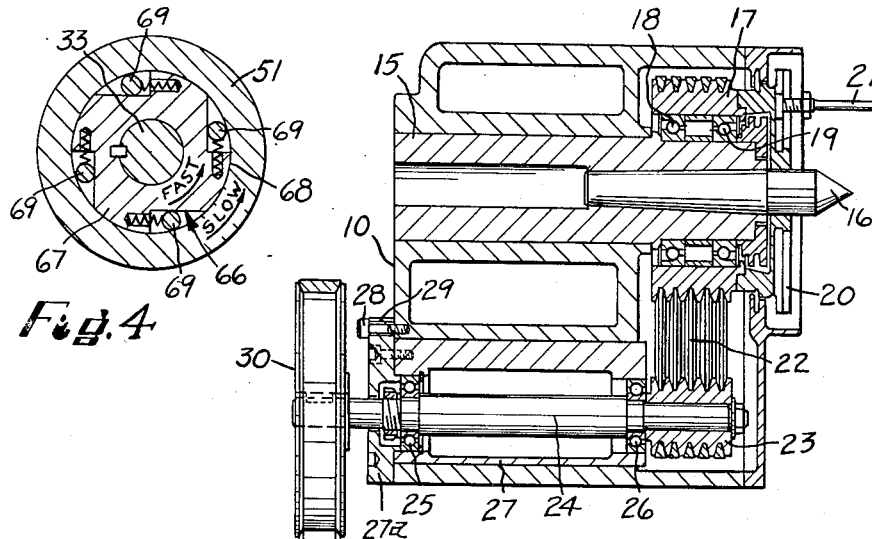
Fig. 4 is a fragmentary sectional view, on an enlarged scale, taken approximately on the line 4—4 of Fig. 3, showing the overrunning or ball clutch.

Both the pulley 45 and the pulley 48 are continuously rotated by the motor 40. When the clutch member 55 is engaged to rotate the shaft 33 rapidly in a counter-clockwise direction (Fig. 4) serves to allow the balls 69 to ride idly within the surface 68 so that pulley 48 may rotate at a relatively slow speed without transmitting any power to the shaft 33. When the clutch 55 is disengaged, the pulley 45 is free to rotate upon the shaft 33 at its relatively high speed and the ball clutch 66 then locks the pulley 48 to the center member 67 to impart a relatively slow rotation to the shaft 33. Due to the ratio of pulley sizes, the high and low speed drive with the 3 to 1 speed ratio provided with the Roto-Cone pulley drive facilitates obtaining a 9 to 1 work speed ratio with a standard single speed motor.

Figure 2:
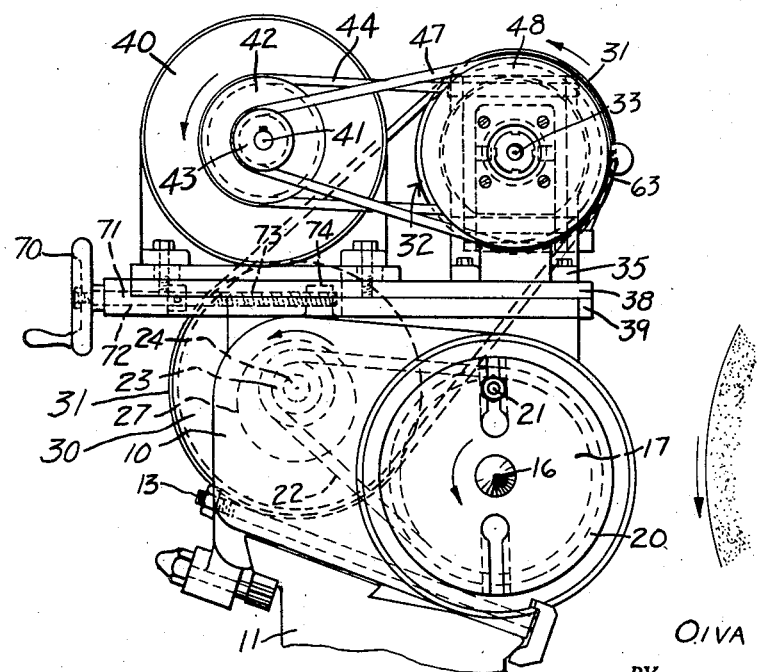
Fig. 2 is a right hand end elevation of the headstock.

In order to facilitate varying the speed between the Roto-Cone pulley 32 and the pulley 30, a manually operative adjusting mechanism is provided for the slide 38 comprising a hand wheel 70 mounted on a rotatable shaft 71 which is journalled in a bearing 72 on the underside of the slide 38. The right hand end of the shaft 71 (Fig. 2) is provided with an integral feed screw 73 which is screw threaded into a nut 74 formed in an upwardly projecting portion of the headstock 10. It will be readily apparent that by manipulation of the hand wheel 70, the slide 38 may be adjusted transversely relative to the headstock 10 so as to vary the center distance between the shaft 24 and the shaft 33 thereby causing the Roto-Cone pulley 32 to expand or contract to vary the speed of rotation of the shaft 24 relative to the shaft 33 thereby providing a 3 to 1 speed reduction therebetween.

Figure 5:
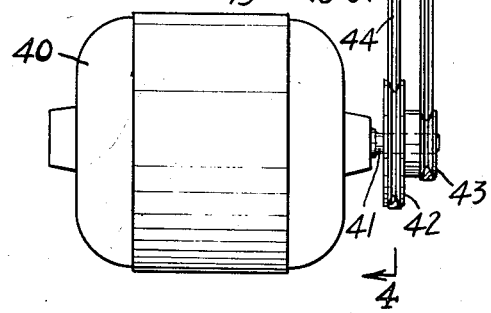
Fig. 5 is a fragmentary sectional view, on an enlarged scale, showing a hydraulic means for actuating the high speed clutch.
Figure 5:
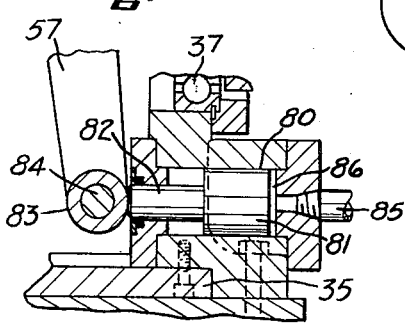

A power operated mechanism is provided to facilitate automatically actuating the clutch 55 by and in timed relation with other mechanisms of the machine, if desired. This mechanism may comprise a fluid pressure cylinder 80 containing a slidably mounted piston 81. A piston rod 82 formed integral with the piston 81 bears against a roller 83 mounted on a stud 84 supported at the lower end of the rock arm 57. When fluid under pressure is passed through a pipe 85 into a cylinder chamber 86, the piston 81 will be moved toward the left (Fig. 5) so as to rock the arm 57 in a clockwise direction to disengage the clutch 55.

The operation of this improved headstock will be readily apparent from the foregoing disclosure. By manipulation of the lever 63, the clutch 55 may be engaged or disengaged to produce either a high speed or a low speed rotation of the shaft 33. By manipulation of the hand wheel 70, the slide 35 may be moved transversely relative to the headstock 10 so as to vary the center distance between the shafts 24 and 33 thereby facilitating a 3 to 1 speed ratio between the shaft 33 and the shaft 24 so that a 9 to 1 speed reduction may be obtained between the driving motor 40 and the face plate 20. By utilizing a 1200 R. P. M. motor with the pulley ratios as illustrated, a low speed range of 20–60 R. P. M. and a high speed range of 60–180 R. P. M. of the face plate or work driver 20 may be obtained. If a 900 R. P. M. motor is provided, with the pulley ratios illustrated, a low speed range of 15–45 R. P. M. and a high speed range of 45–135 R. P. M. is obtained. With a 1800 R. P. M. motor, a low speed range of 30–90 R. P. M. and a high speed range of 90–270 R. P. M. is obtained thereby facilitating a wide range of speeds obtainable by utilizing a constant speed motor for driving a work piece to be ground at the desired speed.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawings is to be interpreted as illustrative and not in a limiting sense.

I claim:

1. In a grinding machine headstock having a base, a work driver rotatably supported therein, and a variable speed driving mechanism therefor including a transversely adjustable slide on said base, a motor on said slide having a motor shaft arranged parallel to the axis of said driver, a transversely adjustable rotatable driven shaft rotatably supported on said slide which is arranged parallel to the motor shaft, a high speed driving connection between the motor shaft and driven shaft, a low speed driving connection between the motor shaft and driven shaft, a manually operable clutch mechanism interposed between said driving connections and said driven shaft arranged so that the driven shaft may be driven at either a high or a low speed, a variable-speed cone pulley drive between said driven shaft and said work driver, and means including a manually operable nut and screw mechanism operatively connected between the slide and headstock base transversely to adjust the position of said slide and driven shaft relative to said base so as to actuate the variable-speed cone pulley drive to vary the speed of the work driver.

2. In a grinding machine headstock having a base, a work driver journalled therein, and a variable speed driving mechanism therefor including a motor thereon having a motor shaft arranged parallel to the work driver, a driven shaft rotatably journalled parallel to said motor shaft, a high speed pulley rotatably mounted on said shaft, a low speed pulley rotatably mounted on said shaft, driving belts connecting said pulleys with said motor shaft, a manually operable slidably mounted clutch member keyed on said shaft to connect the high speed pulley with said shaft, a ball clutch drivingly to connect said low speed pulley with said driven shaft when the clutch member is disengaged, said ball clutch serving during a high speed rotation of said shaft to facilitate continuous rotation of the low speed pulley at its normal speed, a variable-speed cone pulley drive between said driven shaft and said work driver, and means including a nut and screw mechanism transversely to adjust the position of said driven shaft relative to said base to actuate the variable speed cone pulley drive so as to vary the speed of the work driver.

3. In a grinding machine headstock having a base, a work driver rotatably journalled therein, a variable speed driving mechanism therefor including a transversely adjustable slide on said base, a motor thereon having a motor shaft arranged parallel to said work driver, a driven shaft rotatably journalled on said slide parallel to the motor shaft, a high speed pulley rotatably mounted on said driven shaft, a low speed pulley rotatably mounted on said driven shaft, driving belts connecting said pulleys with said motor shaft, a manually operable slidably mounted clutch member on said shaft to connect the high speed pulley with the driven shaft, a ball clutch drivingly to connect said low speed pulley with said shaft when the clutch member is disengaged, said ball clutch serving during high speed rotation of said shaft to facilitate a continuous rotation of the low speed pulley at its normal speed, a variable-speed cone pulley drive between said driven shaft and said work driver, and means including a manually operable nut and screw mechanism transversely to adjust the position of said slide and driven shaft relative to said base so as to actuate the variable-speed cone pulley drive to vary the speed of said work driver.

References Cited in the file of this patent

UNITED STATES PATENTS

| | | |
|---|---|---|
| 314,433 | Cobb | Mar. 24, 1885 |
| 1,806,664 | Belden | May 26, 1931 |
| 2,271,598 | Maurer | Feb. 3, 1942 |
| 2,282,048 | Graf | May 5, 1942 |
| 2,461,027 | Bodmer | Feb. 8, 1949 |
| 2,475,954 | Gerbing | July 12, 1949 |
| 2,475,955 | Gerbing | July 12, 1949 |
| 2,489,725 | Rutemiller | Nov. 29, 1949 |
| 2,538,667 | Chamberlin | Jan. 16, 1951 |